United States Patent Office 3,374,184
Patented Mar. 19, 1968

3,374,184
COPPER CHROMITE-ALKALI METAL OXIDE HIGH SURFACE AREA HYDROGENATION CATALYST
James McEvoy, Morton, and Harold Shalit, Drexel Hill, Pa., assignors to Air Products and Chemicals, Inc., Philadelphia, Pa., a corporation of Delaware
No Drawing. Filed Mar. 11, 1964, Ser. No. 351,238
5 Claims. (Cl. 252—467)

The present invention relates to hydrogenation catalysts and is particularly concerned with improved copper chromite catalyst and methods for preparing same.

Various catalysts comprising varied amounts of copper and chromium are known in the art (Stroupe, JACS, 71 (1949), p. 569) and have been suggested for special uses, particularly in reactions in which controlled hydrogenation is required. An early disclosure of cuprous and cupric chromite catalyst is found in Smith, U.S. 1,889,388, for use in oxidation and reduction of hydrocarbons as well as in polymerization of unsaturates.

The use of copper chromite catalyst in the hydrogenation of furfural to furfuryl alcohol is described by Lazier in U.S. Patent No. 2,077,422. The catalyst described in this patent is prepared by interacting equi-molar proportions of copper nitrate and ammonium chromate solutions, followed by ignition of the basic copper ammonium chromate formed. The ignited catalyst may be further reduced with hydrogen.

Adkins and Connor in U.S. Patent 2,094,975 suggest, in production of furfuryl alcohol from furfural, the use in liquid phase of catalysts comprising copper, chromium and alkaline earth metals. Patentees assert that by use of their proposed catalyst under specified conditions side reactions are minimized, particularly that of over-hydrogenation to tetrahydro-furfuryl alcohol. The catalyst is prepared by coprecipitation from a solution of copper nitrate, alkaline earth nitrate, ammonium dichromate and ammonium hydroxide. The precipitate is filtered and dried in an oven at 75–80° C.

The use of high area copper chromite, as supported or massive catalyst, in the selective hydrogenation of di-olefins in a hydrocarbon stream containing mono-olefins, is described by Kirsch and Weller in U.S. Patent No. 2,964,579. The preferred catalyst described in that patent is prepared by impregnation of activated alumina with a solution of $CrO_3$ and copper nitrate.

In the use of commercial copper chromite catalyst for hydrogenation of furfural, side reactions occur leading to the formation of undesired polymeric materials of resinous character with consequent loss in yield of the desired furfuryl alcohol.

In accordance with the present invention we have found that improved copper chromite type catalysts having high selectivity and activity in the hydrogenation of organic compounds such as aldehydes and ketones to the corresponding alcohols are obtained when a particular sequence of preparation and heat treatment is followed; namely, (a) the reaction of an aqueous solution of copper compound such as cupric nitrate (trihydrate) and an aqueous solution of chromium compound such as chromic oxide in aqueous solution with ammonium hydroxide solution under neutral to slightly acid conditions, for example at a pH between 6.0 and 6.9;

(b) the slurry obtained is filtered, water washed carefully to eliminate ammonium nitrate, dried at moderate temperature, for example at about 250° F., and (c) calcined at carefully controlled ignition temperatures generaly not exceeding about 550° F.

It was further found that copper chromite catalysts are improved in selectivity in the hydrogenation of unsaturated organic compounds by incorporation therein of a minor amount of alkali metal oxide and that the manner of incorporating the alkali metal oxide has an important effect on the activity and selectivity of the ultimate catalyst.

EXAMPLE 1

(a) Cupric nitrate and chromic oxide in equal mol quantities were dissolved in distilled water and reagent grade ammonium hydroxide (28% $NH_3$) slowly added to the solution with vigorous stirring to precipitate hydrated basic copper ammonium chromate in finely divided form. Reaction takes place according to the following equation (I) $Cu(NO_3)_2 \cdot 3H_2O + CrO_3 + 3NH_4OH \rightarrow$
    $Cu(OH)NH_4CrO_4 + 2NH_4NO_3 + 4H_2O$ The pH of the obtained slurry was controlled between 6.0 and 6.5. The precipitate was separated from the mother liquor by filtration and water-washed to remove $NH_4NO_3$ (two or more washes).

(b) The washed precipitate was oven-dried at 250° F. for two hours and ground to powder. The powder was divided into several portions which were each separately ignited in a muffle, as follows (c)   500° F.—2 hours
    (d)   750° F.—2 hours
    (e) 1000° F.—2 hours Two commercial copper chromite catalysts were compared with applicant's copper chromite catalyst prepared under the controlled ignition conditions of Example 1 (d) above in hydrogenation of furfural at 1500 p.s.i.g. and 350° F. with the tabulated result below:

TABLE I

| Catalyst | Area, m.²/g. | Time, Min. | Percent Conv. | Percent Select. | Percent Polymer |
|---|---|---|---|---|---|
| Competitive "G" | 45 | 200 | 51 | 47 | 27 |
| Competitive "H" | 7 | 180 | 16 | 8 | 14 |
| Applicant's Ex. 1(d) | 58 | 20 | 48 | 44 | 26 |

It is noteworthy that:

(1) Competitive catalyst "H" can be eliminated from consideration since it is a low area—low activity catalyst.

(2) At 1500 p.s.i.g. and at approximately equivalent surface area, conversion, selectivity and yield, applicant's catalyst acted in *one-tenth* the time of the best competitive catalyst.

TABLE II.—FURFURAL HYDROGENATION AT 1000 P.S.I.G. 350° F.

| | Area, m.²/g. | Time, min. | Percent Conv. | Percent Select. | Percent Yield | Percent Polymer |
|---|---|---|---|---|---|---|
| Compet."G" | 45 | 120 | 45 | 44 | 20 | 24 |
| Ex. 1(d) | 58 | 40 | 43 | 40 | 17 | 25 |
| Ex. 2(b) | 72 | 40 | 38 | 65 | 25 | 13 |
| Ex. 2(c) | 95 | 33 | 40 | 57 | 23 | 17 |
| Ex. 1(e) | 128 | 36 | 44 | 47 | 21 | 23 |

At 1000 p.s.i.g. and approximately equivalent surface area, conversion, selectivity and polymer formation catalysts of the above examples acted in *one-third* the time of the best competitive catalyst.

On further examination of the effect of increasing catalyst surface area above 50 m.²/g., a series of applicant's catalysts showed reaction times for equivalent conversion decreased with increasing catalyst surface area. An apparent effective range of surface areas would be from 50 to 120 m.²/g. with a yield-selectivity optimum for these catalysts at about 80 to 100 m.²/g.

EXAMPLE 2

(a) Following the procedure outlined in Example 1(a) another batch of catalyst was prepared with the ammonium hydroxide added over a one hour period to maintain about 6.5 pH maximum.

(b) The washed product was dried at 250° F. for two hours and pulverized, (c) A portion of the powder was heat treated at 450° F. for one hour followed by an additional one-hour heat treatment at 500° F. in a high temperature oven.

(d) Another portion of the powder from (b) above was heat treated for one hour at 450° F. and for an additional two hours at 500° F.

The activity of this catalyst is compared in Table II above in dried only and ignited state.

In the use of commercial copper chromite catalyst for hydrogenation of furfural, side reactions occur leading principally to the formation of polymeric resinous materials from which neither furfural nor furfuryl alcohol can be recovered. It was found that the reaction could be effected with sharply improved selectivity by the addition of a small amount of alkali metal oxide to the copper chromite catalyst. At first a commercial copper chromite in finely divided form was impregnated with NaOH solution and dried four hours at 250° F.

EXAMPLE 3

Commercial copper chromite catalyst (type G in Table I) was ground to powder of 100 mesh size and separate portions treated in caustic soda solution to incorporate various amounts of sodium oxide, followed by drying. These catalysts were tested in hydrgenation of furfural at 350° F., 1000 p.s.i.g., for one hour with 1.5 to 1.6% catalyst by weight in the rocker bomb. The effect of the sodium oxide is shown in Table III below.

TABLE III

| Percent Na$_2$O | Conv., vol. Percent | Select., vol. Percent | Yield, Percent | Polymer, Percent |
|---|---|---|---|---|
| 0 | 27 | 79 | 21 | 5.1 |
| 0.1 | 25 | 83 | 21 | 3.8 |
| 1.0 | 14 | 90 | 13 | 1.2 |

With increasing alkali content to a modest value of 0.1%, conversion is not materially reduced while selectivity is improved to a recognizable degree, resulting in the same yield, but with 25% less polymer formation.

When alkali content was increased to 1.0% conversion dropped off rapidly, while selectivity was increased further and polymer formation was only one-fourth of what it would have been with no alkali present. While the indicated decrease in conversion would necessitate a higher recycle ratio to obtain an equivalent ultimate yield of alcohol from aldehyde, the substantial reduction in polymer formation makes for a cleaner separation of products and more economical recovery of alcohol.

The particular sequence and manner of incorporating the alkali into the copper chromite as well as careful calcining had an important effect on the selectivity and activity of the catalyst.

EXAMPLE 4

(a) Reaction between cupric nitrate, chromic oxide and ammonium hydroxide was carried out as described in Example 1(a) above, precipitation being effected at 6.97 pH.

(b) After water-washing the obtained precipitate to remove ammonium nitrate, it was slurried with 10% NaOH solution and again filtered.

(c) The sodium-containing filter cake was dried for two hours at 250° F. and ignited at 450° F. for one hour in air followed by further heating for an additional hour at a recorded temperature of 500° F. The catalyst was found to contain 2.35% by weight Na$_2$O. As a result of the ignition the basic copper ammonium chromate is decomposed with evolution of nitrogen and formation of CuO·CuCr$_2$O$_4$. The active catalyst thus appears to be composed of a mixture of copper oxide and cupric chromite, which in the present instance has sodium oxide associated.

It is important for best results that the ignition be carried out carefully and under controlled conditions not exceeding about 500° F. At higher temperatures reaction between CuO and CuCr$_2$O$_4$ may take place to form Cu$_2$Cr$_2$O$_4$ (cuprous chromite) which is relatively inactive as a hydrogen catalyst. In ignition of the catalyst at 450–500° F. the actual surface temperature of the catalyst may be considerably higher than that measured. To assure against conversion to the inactive form, the ignition should be carried out gently with controlled liberation of heat. Under careful heating conditions as described, catalysts having surface area of about 50 to 150 square meters/gram are obtained. When the catalyst is subjected to ignition at temperatures above about 500° F., there is a considerable loss of surface area with accompanying loss in catalyst activity. Thus, ignition at 750° F. for one hour resulted in catalysts having surface area of 20 to 25 square meters/gram.

Measurements were made of the surface areas of a number of similarly prepared catalysts subjected to different ignition temperatures over the range 300–1500° F. A plot of these recorded values indicates that maximum surface is developed in the range of 450–550° F.

The preparation of catalysts of high activity and selectivity involves essentially the following steps:

(1) Precipitation of Cu(OH)NH$_4$CrO$_4$ from suitable salts or other compounds of copper and chromium under controlled pH of slightly acid to neutral condition.

(2) Removal of NH$_4$NO$_3$ (3) Addition of alkali metal (4) Drying (5) Careful ignition The pH of the initial precipitation reaction should preferably not be permitted to exceed 6.5 since at higher pH on the basic side resolution of Cu(OH)(NH$_4$)CrO$_4$ takes place with the formation of a Cu(NH$_3$)$_2$$^{++}$ complex. Compounds other than the nitrate of copper and chromic anhydride may be employed as the source for the copper and chromium components. The ratio of the reactants can be varied within the range providing an atom unit ratio Cu/Cr from about 0.5 to 5.0; however, preferred catalysts approximate a 1/1 ratio.

In the example described above, water washing was prescribed as the preferred practice to remove the ammonium nitrate. This step may be omitted, if desired, since the NH$_4$NO$_3$ wil be removed on ignition.

Addition of the alkali metal in the preferred preparation is made prior to drying of the catalyst precipitate. It has been found that superior catalysts are obtained by this practice as opposed to adddition of alkali metal by impregantion of the ignited catalyst. Of course, compounds of sodium other than the hydroxide may be used as a source for this ion and other alkali metal compounds could be utilized such as those of potassium or lithium. The presence of the alkali metal in the catalyst apparently serves to inactivate the otherwise inherent acid function which leads to the promotion of acid catalyzed side reactions accompanying hydrogenation.

The amount of alkali metal added should be sufficient to provide 0.01 to 5.0% M$_2$O by weight of the catalyst, in which M is an alkali metal. For this purpose the concentration of active alkali metal components in the treating solution may be in the range of about 0.1 to 5.0%.

In carrying out the ignition of the catalyst, however, extreme care must be exercised as the temperature approaches about 400° F. In the range of about 430 to 480° F. there is an exotherm developed so that heating in this range must be controlled to avoid too rapid a temperature rise. It may be necessary to blow with air or inert gas to take care of excessive or too rapid heating. The peak temperature of heat treatment should be carefully controlled to be from 450° F. to 550° F. After the exotherm is no longer evidenced, higher temperatures of ignition do not have as great an adverse effect on the catalyst activity. Accordingly, it is sometimes desirable to maintain the heating treatment at a temperature between about 420 and 450° F. for approximately one hour before heating at higher ignition temperatures of about 530° F.

The activity and selectivity of the catalyst can be tested in a standardized reaction in hydrogenation of furfurals in a rocker bomb at 1000 p.s.i.g. hydrogen pressure and 350° F. for one hour at 1.5 to 1.6% catalyst concentration. The effect of sodium addition catalyst activity and selectivity is illustrated in the following runs described in Table IV below. The selectivity of the catalyst is defined as:

$$\frac{\text{Percent furfural in liquid product}}{\text{Percent conversion (furfural disappearance)}} \times 100$$

TABLE IV

| Catalyst | Percent $Na_2O$ | Time, min. | Percent Conv. | Percent Select. | Percent Yield | Percent Polymer |
|---|---|---|---|---|---|---|
| "G" | 0 | 120 | 45 | 44 | 20 | 24 |
| Ex. 2(d) | 0 | 40 | 38 | 65 | 25 | 17 |
| Ex. 4(c) | 2.35 | 23 | 40 | 99 | 40 | 0 |

On the basis of these results it is apparent that applicant's non-alkaline copper chromite gave a 25% better furfuryl alcohol yield than a competitive commercial catalyst in one-fourth the reaction time, while polymer formation was 30% less. Furthermore a soda promoted copper chromite prepared according to Example 4 gave a 100% better yield of alcohol that the comparison commercial catalyst in less than one-fifth the reaction time while polymer formation was negligible.

The improved catalysts of the invention are useful in promoting selective hydrogenation reactions including, in addition to the aldehyde hydrogenation reactions already described, such as the hydrogenation of ketones to secondary alcohols and of nitriles to corresponding amino compounds.

EXAMPLE 5

The catalyst was prepared following generally the procedure described in Examples 1 and 4 above.

Materials: Parts by weight
$HNO_3$ (42°) Baumé _____ 18.2
CuO _____ 7.7
$CrO_3$ _____ 9.2
$NH_4OH$ (30%), to pH.

(a) The nitric acid was diluted with water using 1 gallon for each 3.64 pounds of the 42 Bé. $HNO_3$, and the mixture warmed to 60° C. The CuO was dissolved in the diluted nitric acid at this temperature, and the $CrO_3$ then added slowly with agitation until dissolved. The solution was then cooled to 30° C. and neutralized with $NH_4OH$ to pH 6, effecting precipitation.

The obtained precipitate was recovered by filtration and water washed three times by reslurrying and filtering, then dried at 250° F.

(b) One portion of the dried product was treated with 1% NaOH solution in an amount to add 51 g. NaOH per kilogram of dried product.

(c) The sodium containing product was dried and then heated to 420° F. over a one-hour period and the temperature then raised and held between 420 to 530° F. (average 512° F.) for an additional 1½ hours.

The obtained catalyst had a surface area of 66 m.²/gram and contained about 0.86% $Na_2O$.

The catalyst was custom ground to 1–5μ size and evaluated in the hydrogenation of acetone to isopropyl alcohol as compared with a commercial copper chromite catalyst (G) of 325 mesh size. The hydrogenation in each instance was carried out at 300° F. and 1000 p.s.i.g., and at a catalyst/acetone weight ratio of 0.019. The time required for the substrate to react with 0.5 mol $H_2$ was 13 minutes for the catalyst of the example as compared to 82 minutes for the commercial catalyst. At equivalent reactor time of 30 minutes, the hydrogenation was 95% complete with the catalyst of the example as contrasted with 15% complete using the commercial catalyst.

For use in the customary hydrogenation of furfural no significant change in the typical operating condtions is required when substituting the new catalyst. Pre-reduction of the catalyst with hydrogen can be accomplished in the reactor at the start of the run. In operation, hydrogen is supplied continuously to a batch reactor containing the catalyst at 1000–1500 p.s.i.g., and the reactor maintained at 250–450° F. for the required time to reach desired level of conversion.

Obviously, many modifications and variations of the invention as hereinbefore set forth may be made without departing from the spirit and scope thereof and therefore only such limitations should be imposed as are indicated in the appended claims.

What is claimed is:

1. The method of catalyst preparation which comprises incorporating alkali metal compound into cupric ammonium chromate, and thereafter igniting the obtained mixture at about 450–550° F. to transform the alkali metal compound to alkali metal oxide, and to decompose said chromate compound to form cupric chromite the amount of alkali metal oxide so incorproated being 0.01 to 5% by weight of the ignited catalyst, said catalyst being more selective than previously marketed copper chromite catalyst for hydrogenation of furfural to furfuryl alcohol.

2. The method of catalyst preparation which comprises reacting at neutral to slightly acid pH conditions cupric nitrate with chromic oxide in substantially molar proportions in the presence of ammonium hydroxide to obtain a precipitate containing copper and chromate, removing the by-product ammonium nitrate from said precipitate by washing, further treating the thus purified precipitate to incorporate soluble sodium compound therein corresponding to from 0.01 to 5% alkali metal oxide by weight of the cupric chromite catalyst, drying the sodium-containing material and thereafter heating the same in the temperaturer ange of 450–550° F. for at least one hour to form cupric chromite catalyst more selective than previously marketed copper chromite catalyst for hydrogenation of furfural to furfury alcohol.

3. The method according to claim 2 wherein said heating is effected by treatment at about 420–450° F. for approximately one hour followed by further heating at higher temperature not exceeding 530° F. for at least an additional hour.

4. In a method of preparing a catalyst comprising cupric chromite suitable for the hydrogenation of furfural to furfuryl alcohol in which method an aqueous solution of copper compound is reacted with an aqueous solution of chromium compound to form a precipitate having an atom unit ratio of Cu/Cr of from 0.5 to 5.0 and in which method a composition comprising such precipitate is heated at an elevated temperature to form a cupric chomite containing catalyst, the improvement which consists essentially of: controlling the concentrations of potential ammonium ion and hydrogen ion in the reaction mixture in which the precipitate is formed to maintain a ratio of such potential ammonium ion to total copper ion greater than about 2 to 1 and to maintain a pH of from about 6.0 to about 6.9 whereby only trace amounts of soluble copper ammonia complex ions are formed; washing the precipitate to remove a significant portion of water-soluble by-products; treating the washed precipitate with an alkaline aqueous impregnating solution containing an amount of oxide of alkali metal from about 0.01% to about 5% of the weight of oxides of chromium and copper in the heat treated catalyst, and the concentration of the alkali oxide in the aqueous impregnating solution being from about 0.1 to about 5% by weight, thereby impregnating alkali metal ions uniformly throughout the precipitate; and controlling the temperature of the heat treatment of the alkali impregnated precipitated to be from 450° F. to 550° F. to form a cupric chromite containing catalyst more selective than previously commercially marketed copper chromite catalyst for hydrogenation of furfural to furfuryl alcohol.

5. A cupric chromite catalyst having significantly superior selectivity for the hydrogenation of furfural to furfuryl alcohol, and having a surface area of 50 to 150 square meters per gram prepared by the method of claim 4.

References Cited

UNITED STATES PATENTS

| | | | |
|---|---|---|---|
| 2,137,407 | 11/1938 | Lazier | 260—347.8 X |
| 2,913,497 | 11/1959 | Grimme et al. | 252—467 X |
| 2,964,579 | 12/1960 | Kirsch et al. | 252—467 X |

FOREIGN PATENTS

| | | |
|---|---|---|
| 621,743 | 4/1949 | Great Britain. |
| 123,523 | 11/1959 | Russia. |

DANIEL E. WYMAN, *Primary Examiner.*

OSCAR R. VERTIZ, *Examiner.*

P. KONOPKA, G. T. OZAKI, *Assistant Examiner.*